(12) United States Patent
Matres et al.

(10) Patent No.: US 10,677,990 B2
(45) Date of Patent: Jun. 9, 2020

(54) POLARIZATION DIVERSE RING RESONATOR RECEIVERS

(71) Applicant: Hewlett Packard Enterprise Development LP, Houston, TX (US)

(72) Inventors: Joaquin Matres, Palo Alto, CA (US); Wayne Victor Sorin, Mountain View, CA (US); Sagi Mathai, Sunnyvale, CA (US); Lars Helge Thylen, Palo Alto, CA (US); Michael Renne Ty Tan, Menlo Park, CA (US); Marco Fiorentino, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/781,531

(22) PCT Filed: Dec. 11, 2015

(86) PCT No.: PCT/US2015/065325
§ 371 (c)(1),
(2) Date: Jun. 5, 2018

(87) PCT Pub. No.: WO2017/099803
PCT Pub. Date: Jun. 15, 2017

(65) Prior Publication Data
US 2018/0275348 A1    Sep. 27, 2018

(51) Int. Cl.
*G02B 6/293*    (2006.01)
*H04B 10/60*    (2013.01)

(52) U.S. Cl.
CPC ..... *G02B 6/29395* (2013.01); *G02B 6/29302* (2013.01); *G02B 6/29343* (2013.01); *H04B 10/60* (2013.01)

(58) Field of Classification Search
CPC ............. G02B 6/29343; G02B 6/29395
See application file for complete search history.

(56) References Cited

U.S. PATENT DOCUMENTS 5,809,184 A * 9/1998 Doerr ............. G02B 6/12016
385/11
6,052,495 A * 4/2000 Little ................ G02F 1/011
385/2

(Continued)

FOREIGN PATENT DOCUMENTS

WO    WO-2014147821 A1    9/2014

OTHER PUBLICATIONS

Bogaerts, W. et al., "A Polarization-diversity Wavelength Duplexer Circuit in Silicon-on-insulator Photonic Wires," Feb. 19, 2007, 12 pages.

(Continued)

*Primary Examiner* — Rhonda S Peace
(74) *Attorney, Agent, or Firm* — Sheppard Mullin Richter & Hampton LLP

(57) ABSTRACT

In the examples provided herein, a system includes a loop waveguide; and a grating coupler formed on the loop waveguide to couple light impinging on the grating coupler having a first polarization into the loop waveguide in a first direction, and to couple light having a second polarization, orthogonal to the first polarization, into the loop waveguide in a second direction. The system also includes a ring resonator positioned near the loop waveguide tuned to have a resonant wavelength at a first wavelength to couple light at the first wavelength out of the loop waveguide into the ring resonator. An output waveguide positioned near the ring resonator couples light out of the ring resonator into the (Continued)

output waveguide; and a photodetector detects light propagating out of a first end and a second end of the output waveguide.

18 Claims, 15 Drawing Sheets

(56) References Cited

U.S. PATENT DOCUMENTS

| | | | |
|---|---|---|---|
| 6,483,959 B1 | 11/2002 | Singh et al. | |
| 6,833,946 B2 | 12/2004 | Islam | |
| 7,065,272 B2 | 6/2006 | Taillaert et al. | |
| 7,065,276 B2* | 6/2006 | Scheuer | G02B 6/12007 385/50 |
| 7,120,333 B2 | 10/2006 | Eder et al. | |
| 7,145,660 B2* | 12/2006 | Margalit | G01N 21/45 356/477 |
| 7,283,707 B1* | 10/2007 | Maleki | B82Y 20/00 385/15 |
| 7,421,168 B1* | 9/2008 | Goutzoulis | G02B 6/12007 385/50 |
| 7,466,883 B2* | 12/2008 | Bradley | G02B 6/12007 385/30 |
| 7,539,375 B2* | 5/2009 | Popovic | G02B 6/12007 385/129 |
| 7,738,527 B2* | 6/2010 | He | H01S 5/026 372/108 |
| 7,973,265 B2* | 7/2011 | Chu | G02B 6/12007 219/201 |
| 8,032,027 B2* | 10/2011 | Popovic | G02B 6/12007 398/82 |
| 8,351,118 B2* | 1/2013 | Tokita | G02B 5/3041 359/485.01 |
| 8,655,114 B2* | 2/2014 | Popovic | G02B 6/12007 385/1 |
| 8,746,890 B2* | 6/2014 | Ishimatsu | G02B 5/3058 349/7 |
| 9,584,246 B2* | 2/2017 | Jeong | G02B 6/29397 |
| 9,664,854 B2* | 5/2017 | Kato | G02B 6/12 |
| 9,832,552 B2* | 11/2017 | Lee | H04Q 11/0005 |
| 10,372,014 B1* | 8/2019 | Vidrighin | G02F 1/365 |
| 2002/0039470 A1* | 4/2002 | Braun | G02B 6/12002 385/50 |
| 2004/0247227 A1 | 12/2004 | Eder et al. | |
| 2005/0128566 A1* | 6/2005 | Savchenkov | G02B 6/29341 359/321 |
| 2007/0097375 A1 | 5/2007 | Sanders et al. | |
| 2008/0123188 A1 | 5/2008 | Klein et al. | |
| 2008/0166095 A1* | 7/2008 | Popovic | G02B 6/107 385/126 |
| 2012/0140208 A1 | 6/2012 | Magnusson et al. | |
| 2012/0207428 A1 | 8/2012 | Roelkens et al. | |
| 2014/0376000 A1 | 12/2014 | Swanson et al. | |
| 2015/0260914 A1 | 9/2015 | Zheng et al. | |
| 2018/0210241 A1* | 7/2018 | Seyedi | G02B 6/287 |
| 2018/0275348 A1* | 9/2018 | Matres | G02B 6/29302 |

OTHER PUBLICATIONS

Ciminelli, C. et al., "A New Integrated Optical Angular Velocity Sensor," Oct. 31, 2005, 8 pages.

Taillaert et al., "Grating couplers for coupling between optical fibers and nanophotonic waveguides," Japanese Journal of Applied Physics, vol. 45, No. 8A, 2006, pp. 6071-6077.

Taillaert et al., "A compact two-dimensional grating coupler used as a polarization splitter," IEEE Photonics Technology Letters, vol. 15, No. 9, Sep. 2003, pp. 1249-1251.

Smit et al., "PHASAR-based WDM-devices: principles, design and applications," IEEE Journal of Selected Topics in Quantum Electronics, vol. 2, No. 2, Jun. 1996, pp. 236-250.

Selvaraja et al., "Loss Reduction in Silicon Nanophotonic Waveguide Micro-bends Through Etch Profile Improvement," Optics Communications, vol. 284, No. 8, 2011, pp. 2141-2144.

Pu et al., "Ultra-low-loss inverted taper coupler for silicon-on-insulator ridge waveguide," Optics Communications, vol. 283, No. 19, 2010, pp. 3678-3682.

Pathak et al., "Compact SOI-Based polarization diversity wavelength de-multiplexer circuit using two symmetric AWGs," in European Conference and Exhibition on Optical Communication (Optical Society of America, Netherlands, 2012), 3 pages.

Pathak et al., "Compact SOI-based Awg with flattened spectral response using a MMI," in IEEE International Conference on Group IV Photonics (Institute of Electrical and Electronics Engineers, London, 2011), pp. 45-47.

Little et al., "Very high-order microring resonator filters for WDM applications," IEEE Photonics Technology Letters, vol. 16, Issue 10, Oct. 2004, pp. 2263-2265.

Laere et al., "Focusing polarization diversity grating couplers in silicon-on-insulator," Journal of Lightwave Technology, vol. 27, No. 5, Mar. 2009, pp. 612-618.

Kohtoku et al., InP-based 64-channel arrayed waveguide grating with 50 GHz channel spacing and up to -20 dB crosstalk, Electronics Letters, vol. 33, 1997, pp. 1786-1787.

International Search Report and Written Opinion received for PCT Patent Application No. PCT/US2015/065325, dated Jul. 29, 2016, 10 pages.

Himeno et al., "Silica-based planar lightwave circuits," IEEE Journal of Selected Topics in Quantum Electronics , vol. 4, No. 6, 1998, pp. 913-924.

Halir et al., "Reducing polarization dependent loss of silicon-on-insulator fiber to chip grating couplers," IEEE Photonics Technology Letters, vol. 22, No. 6, 2010, pp. 389-391.

Fukazawa et al., "Very compact arrayed-waveguide-grating demultiplexer using Si photonic wire waveguides," Japanese Journal of Applied Physics, vol. 43, No. 5B, 2004, pp. L673-L675.

Fang et al., "WDM multi-channel silicon photonic receiver with 320 Gbps data transmission capability," Optics Express, vol. 18, No. 5, 2010, pp. 5106-5113.

European Search Report and Search Opinion Received for EP Application No. 15910417.3, dated Oct. 24, 2018, 8 pages.

Doerr et al., "Polarization diversity waveguide grating receiver with integrated optical preamplifiers," IEEE Photonics Technology Letters, vol. 9, No. 1, 1997, pp. 85-87.

Bogaerts et al., "Silicon-on-insulator spectral filters fabricated with CMOS technology," IEEE Journal of Selected Topics in Quantum Electronics, vol. 16, No. 1, Jan./Feb. 2010, pp. 33-44.

Bogaerts et al., "Compact wavelength-selective functions in silicon-on-insulator photonic wires," IEEE Journal of Selected Topics in Quantum Electronics, vol. 12, No. 6, 2006, pp. 1394-1401.

Barwicz et al., "Polarization-transparent microphotonic devices in the strong confinement limit," Nature photonics, vol. 1, Jan. 2007, pp. 57-60.

* cited by examiner

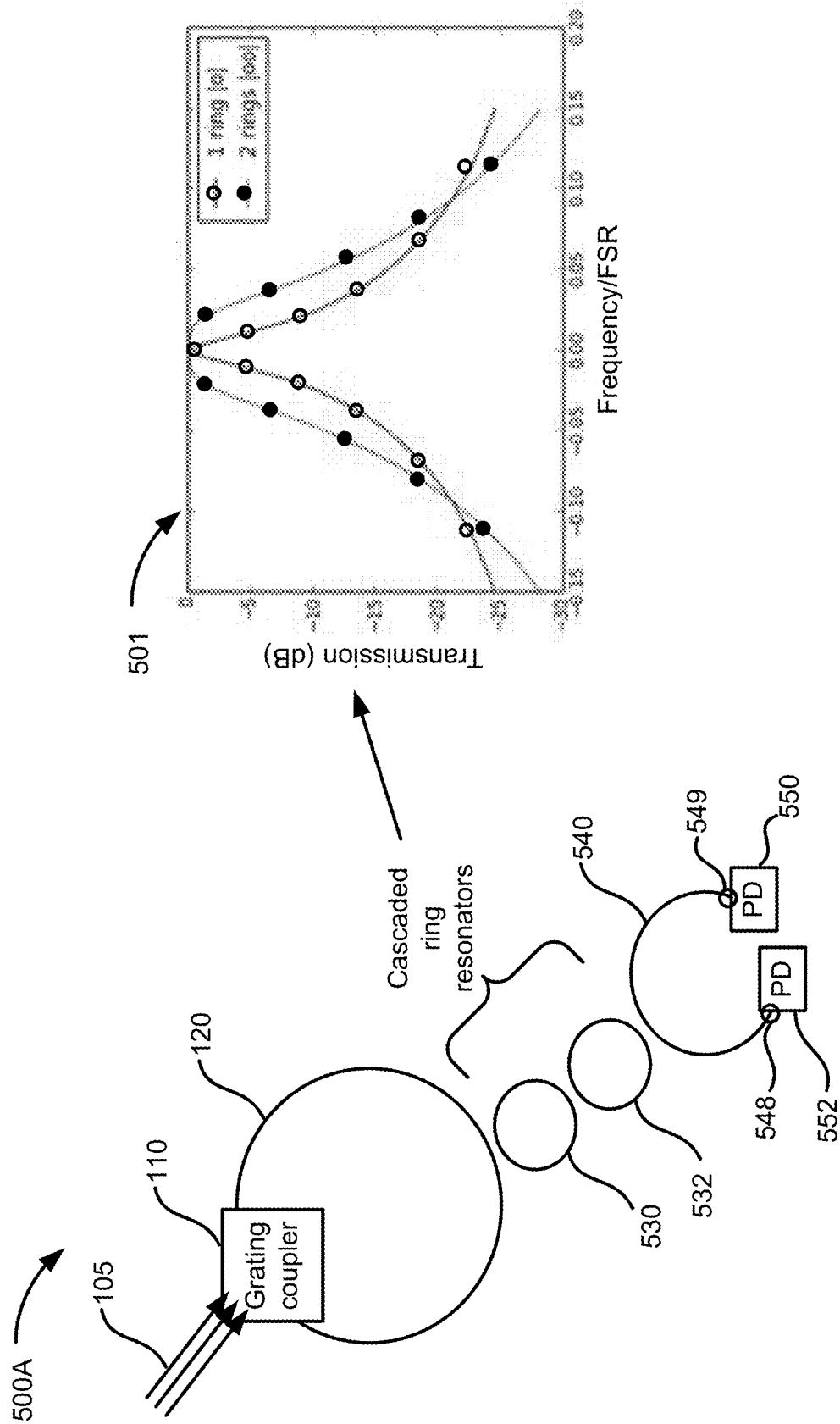
FIG. 5A1

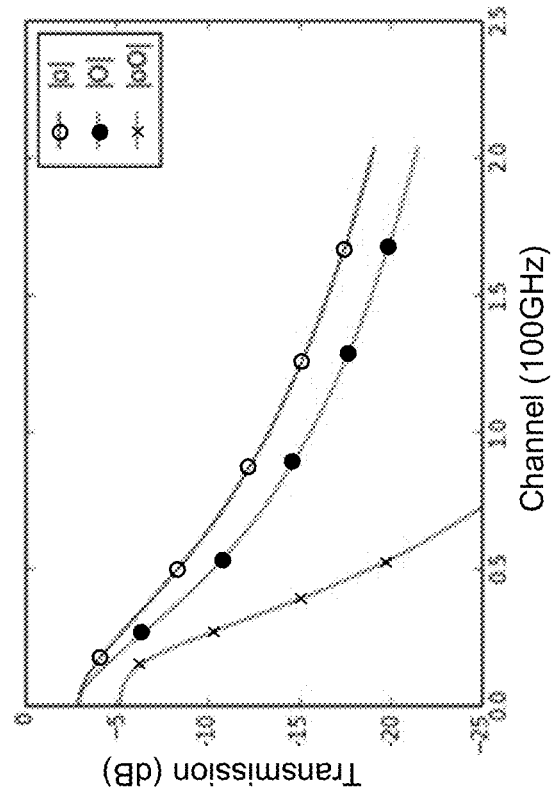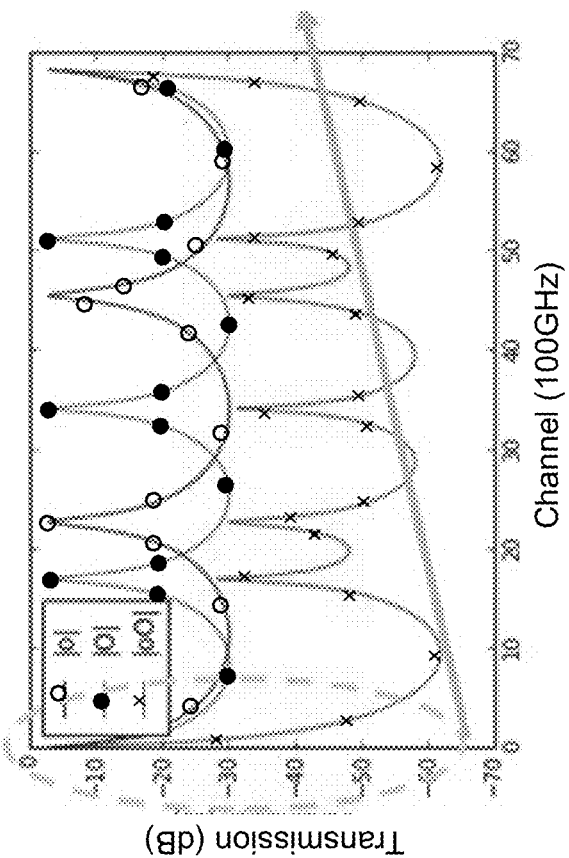
FIG. 5A2

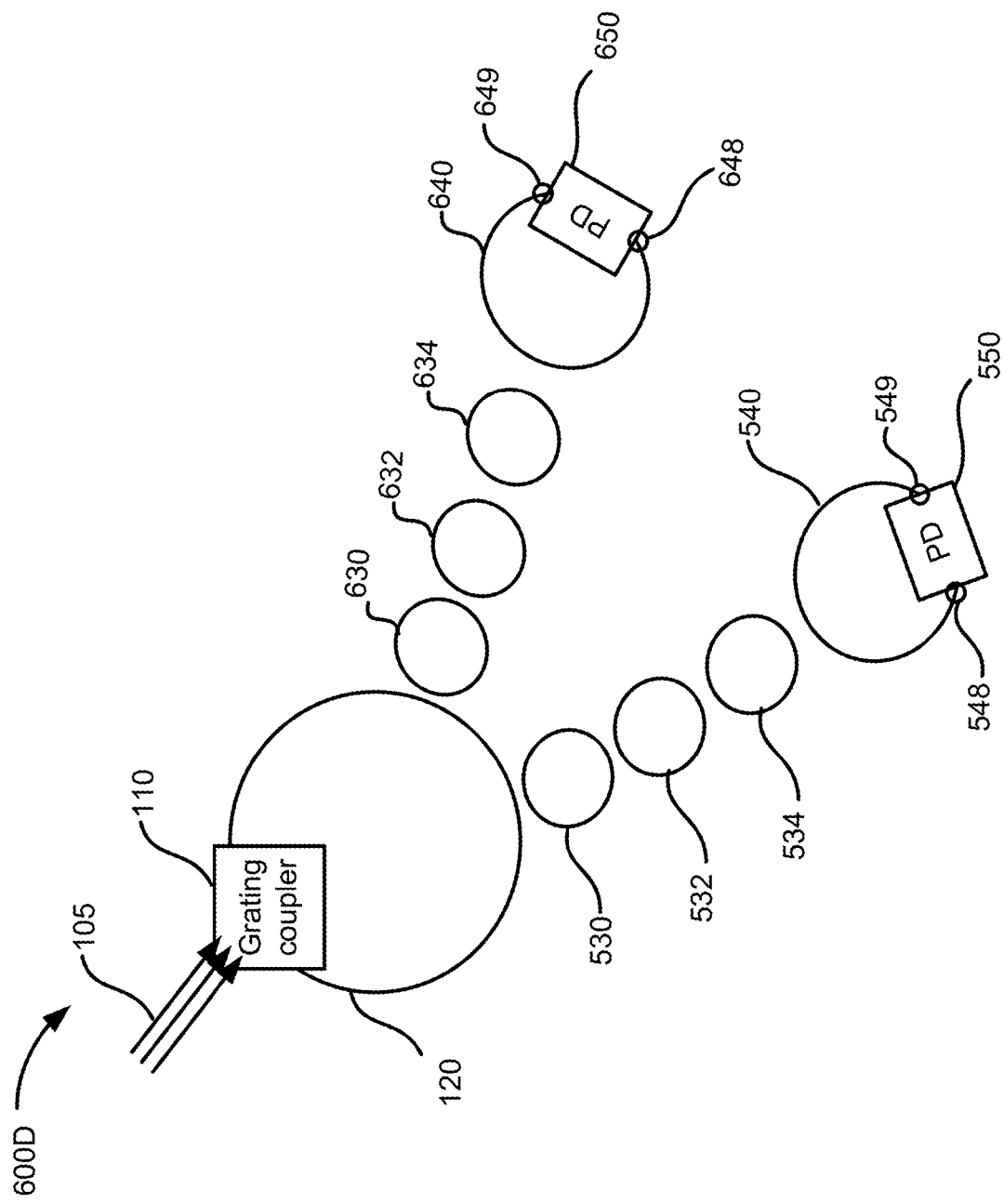

800

```
┌─────────────────────────────────────────────────────────────────┐
│ Detect with a first photodetector light propagating out of a first end of a │
│                    first output waveguide                        │
│                              805                                 │
└─────────────────────────────────────────────────────────────────┘
                                │
                                ▼
┌─────────────────────────────────────────────────────────────────┐
│ Detect with a second photodetector light propagating out of a second │
│              end of the first output waveguide                   │
│                              810                                 │
└─────────────────────────────────────────────────────────────────┘
                                │
                                ▼
┌─────────────────────────────────────────────────────────────────┐
│ Detect with a third photodetector light propagating out of a first end of a │
│                   second output waveguide                        │
│                              815                                 │
└─────────────────────────────────────────────────────────────────┘
                                │
                                ▼
┌─────────────────────────────────────────────────────────────────┐
│ Detect with a fourth photodetector light propagating out of a second end │
│                 of a second output waveguide                     │
│                              820                                 │
└─────────────────────────────────────────────────────────────────┘
                                │
                                ▼
┌─────────────────────────────────────────────────────────────────┐
│          Tune the resonant wavelength of the first ring resonator │
│                              825                                 │
└─────────────────────────────────────────────────────────────────┘
```

*FIG. 8*

POLARIZATION DIVERSE RING RESONATOR RECEIVERS

BACKGROUND

A ring resonator is a waveguide formed in a closed loop. Light can be coupled from a second waveguide placed close to the ring resonator. At resonant wavelengths of the ring resonator, optical power from the second waveguide develops as a traveling wave in the ring resonator. However, light propagating at non-resonant wavelengths in the second waveguide continues to propagate with no coupling effect to the ring resonator. The resonant wavelength of the ring resonator can be tuned by changing the effective refractive index of the waveguide.

BRIEF DESCRIPTION OF THE DRAWINGS

The accompanying drawings illustrate various examples of the principles described below. The examples and drawings are illustrative rather than limiting.

FIG. 5A1 depicts a diagram of an example receiver system that includes cascaded ring resonators with two photodetectors, and includes an example plot of transmission as a function of frequency/free spectral range (FSR) for two cascaded ring resonators.

FIG. 5A2 depicts an example plot of transmission as a function of frequency/free spectral range (FSR) for two cascaded ring resonators used in a polarization diverse receiver system.

FIG. 6D depicts a diagram of another example receiver system that includes two sets of cascaded ring resonators, each set having a single photodetector.

FIG. 8 depicts a flow diagram illustrating another example process of detecting light having orthogonal polarization components.

DETAILED DESCRIPTION

Light propagating in an optical fiber may have a random state of polarization that may be decomposed into two orthogonal linearly polarized components. As described below, light from the optical fiber may be received by a photonics integrated circuit, and through the use of a ring resonator, a single photodetector may be used to detect light having both orthogonal polarizations.

Figure 1B:
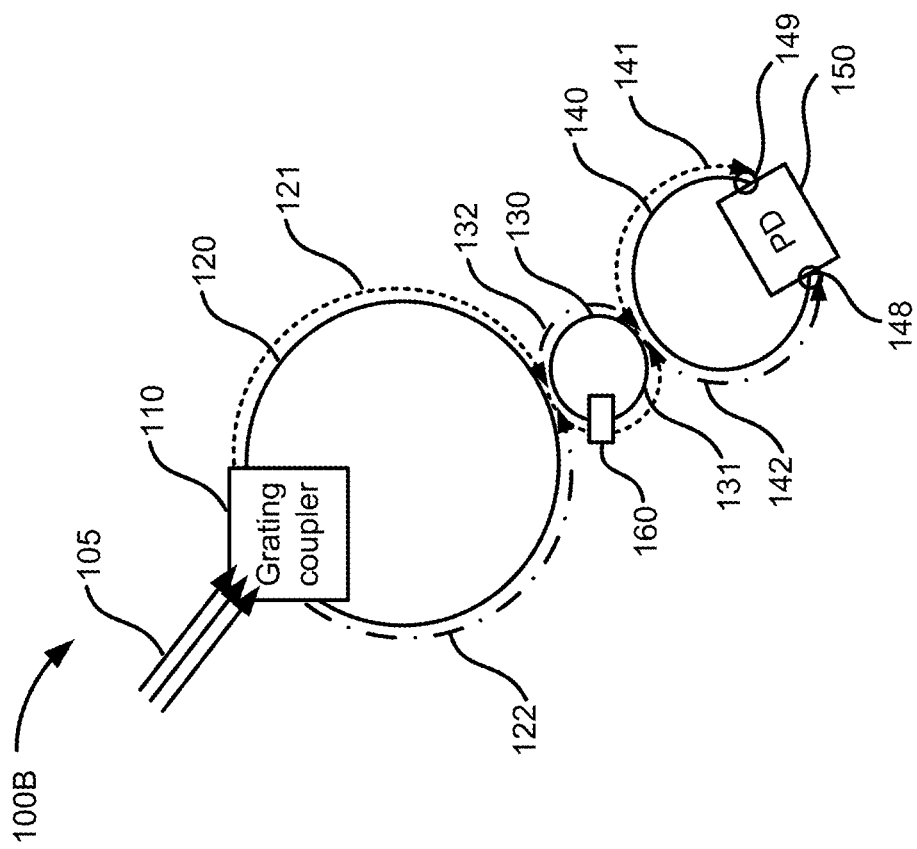
FIG. 1B depicts the example system of FIG. 1A with an additional wavelength-tuning mechanism.
Figure 1A:
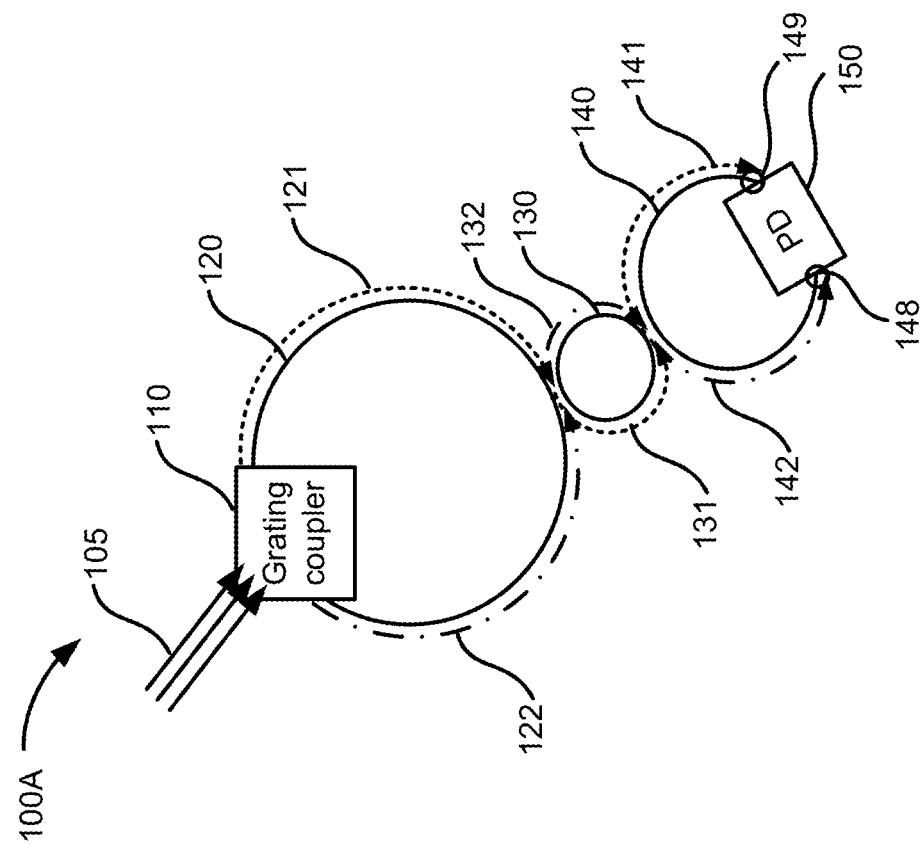
FIG. 1A depicts a diagram of an example receiver system that includes a grating coupler, a loop waveguide, a ring resonator, an output waveguide, and a single photodetector.

FIG. 1A depicts a diagram of an example polarization diversity receiver system 100A that includes a grating coupler 110, a loop waveguide 120, a ring resonator 130, an output waveguide 140, and a single photodetector 150.

Light 105 having a random state of polarization may impinge upon the grating coupler 110. In some implementations, the light may be coming from a single-mode optical fiber (not shown) that can support two orthogonal linearly polarized modes such that the light 105 is in an elliptical state of polarization. In this case, the optical fiber may be physically in contact or in close proximity with the grating coupler 110. The optical fiber may be oriented perpendicular or at an angle to the grating coupler 110.

The grating coupler 110 may be an optical grating structure, such as a diffraction grating, that has periodic and/or non-periodic structural components, such as posts or holes of any shape; lines; or grooves. The grating coupler 110 may be a two-dimensional grating that has periodic and/or non-periodic structural components in two dimensions.

The grating coupler 110 may be formed on a loop waveguide 120, for example, the loop waveguide 120 may be integrated with a photonic integrated circuit. A top-down view of the loop waveguide 120 may have any shape, such as a circle, racetrack, ellipse, or any other closed configuration.

When light 105 impinges upon the grating coupler 110, light having a first polarization may couple into the loop waveguide 120 in a first direction, for example, in a clockwise direction 121, and light having a second polarization orthogonal to the first polarization may couple into the loop waveguide 120 in a second direction, for example, in a counter-clockwise direction 122. Once the orthogonal polarizations from the fiber are coupled into the loop waveguide 120, the clockwise 121 and counter-clockwise 122 propagating light have substantially the same polarization. For example, the clockwise 121 and counter-clockwise 122 propagating light may have transverse electric (TE) polarization.

The first ring resonator 130 may be positioned near the loop waveguide 120. The first ring resonator 130 is a waveguide, for example, integrated with the photonic integrated circuit of the loop waveguide 120, and is a closed loop. The shape of the loop may be, for example, circular, elliptical, or a racetrack shape. The first ring resonator 130 may have a resonant wavelength at a first wavelength to evanescently couple light at the first wavelength out of the loop waveguide 120 into the first ring resonator 130, while light propagating in the loop waveguide 120 at non-resonant wavelengths of the first ring resonator 130 continue propagating in the loop waveguide 120 with no coupling effect to the first ring resonator 130.

The first output waveguide 140 may be positioned near the first ring resonator 130 to couple light out of the first ring resonator 130 into the first output waveguide 140. Additionally, a single photodetector 150 may be used to detect light propagating out of a first end 149 and a second end 148 of the first output waveguide 140. Alternatively, the first end 149 and second end 148 of the first output waveguide 140 may be located on the same side of the photodetector 150. The photodetector 150 may be a broadband detector, however, because the first ring resonator 130 operates as a bandpass filter, coupling just the light at the resonant wavelength, the photodetector 150 output corresponds to the optical power impinging on the grating coupler 110 at the resonant wavelength.

When the first ring resonator 130 is tuned to the first wavelength, light 121 propagating in the loop waveguide 120 in the clockwise direction at the first wavelength is coupled into the first ring resonator 130 in the counter-clockwise direction 131. The light is then evanescently coupled into the first output waveguide 140 in the clockwise direction 141 until it exits the first end 149 of the first output waveguide and is detected by the photodetector 150. Similarly, light 122 propagating in the loop waveguide 120 in the counter-clockwise direction at the first wavelength is coupled into the first ring resonator 130 in the clockwise direction 132. The light is then evanescently coupled into the first output waveguide 140 in the counter-clockwise direction 142 until it exits the second end 148 of the first output waveguide and is detected by the photodetector 150. Thus, a single photodetector 150 may be used to detect both orthogonal polarizations of light 105.

FIG. 1B depicts the example system of FIG. 1A with an additional mechanism 160 to tune the resonant wavelength of the first ring resonator 130. The mechanism 160 tunes the resonant wavelength by inducing a change in the refractive index of the first ring resonator 130 over a certain length, for example, by injecting carriers or changing the temperature of a portion or all of the ring resonator. In the example configuration of FIG. 1B, by adjusting the resonant wavelength of the first ring resonator 130, the photodetector 150 detects the optical power of the light at the resonant wavelength impinging on the grating coupler 110.

Figure 1D:
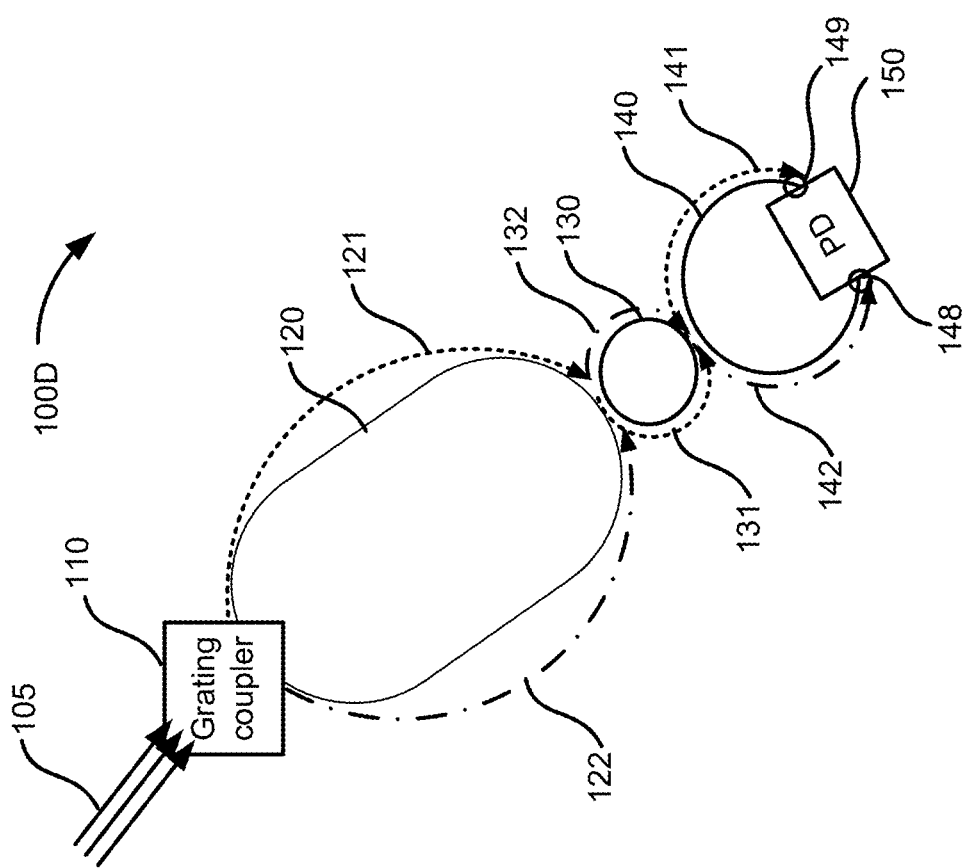
FIG. 1D depicts a diagram of an example receiver system that includes a grating coupler, a racetrack-shaped loop waveguide, a ring resonator, an output waveguide, and a single photodetector.
Figure 1C:
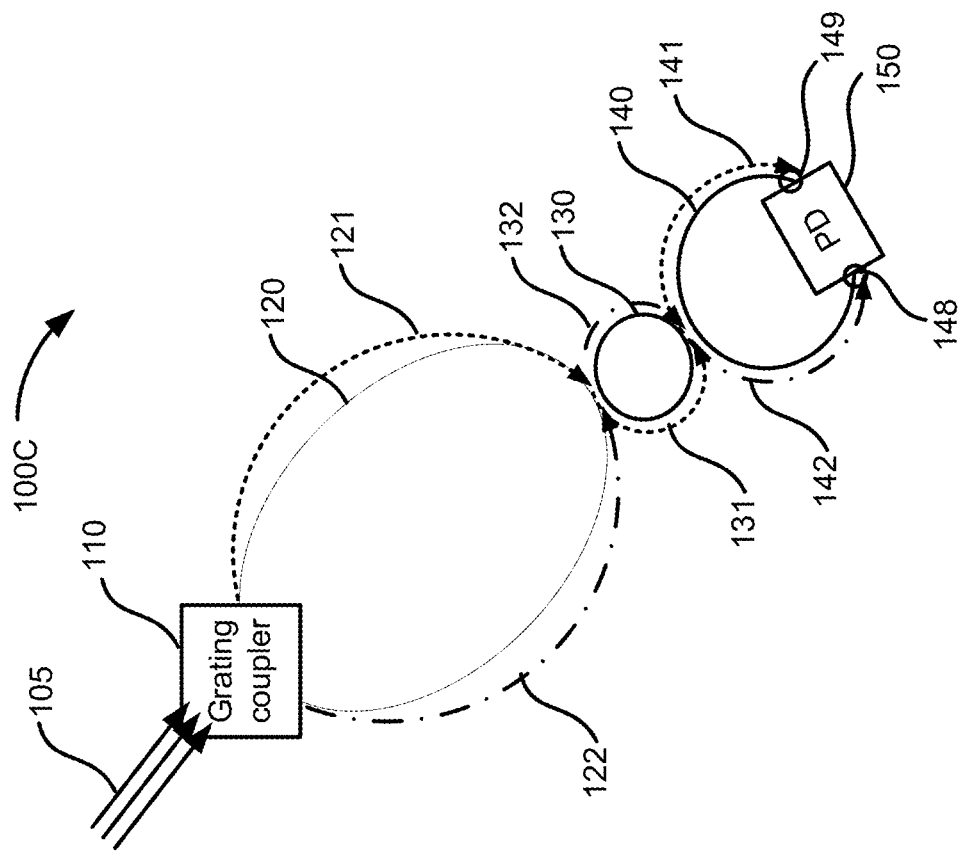
FIG. 1C depicts a diagram of an example receiver system that includes a grating coupler, an elliptical-shaped loop waveguide, a ring resonator, an output waveguide, and a single photodetector.

FIG. 1C depicts a diagram of an example receiver system that includes a grating coupler, an elliptical-shaped loop waveguide, a ring resonator, an output waveguide, and a single photodetector. The system 100C is similar to system 100A described above in FIG. 1A, however, loop waveguide 120 is elliptical-shaped.

FIG. 1D depicts a diagram of an example receiver system that includes a grating coupler, a racetrack-shaped loop waveguide, a ring resonator, an output waveguide, and a single photodetector. The system 100D is similar to system 100A described above in FIG. 1A, however, loop waveguide 120 is racetrack-shaped.

Figure 2:
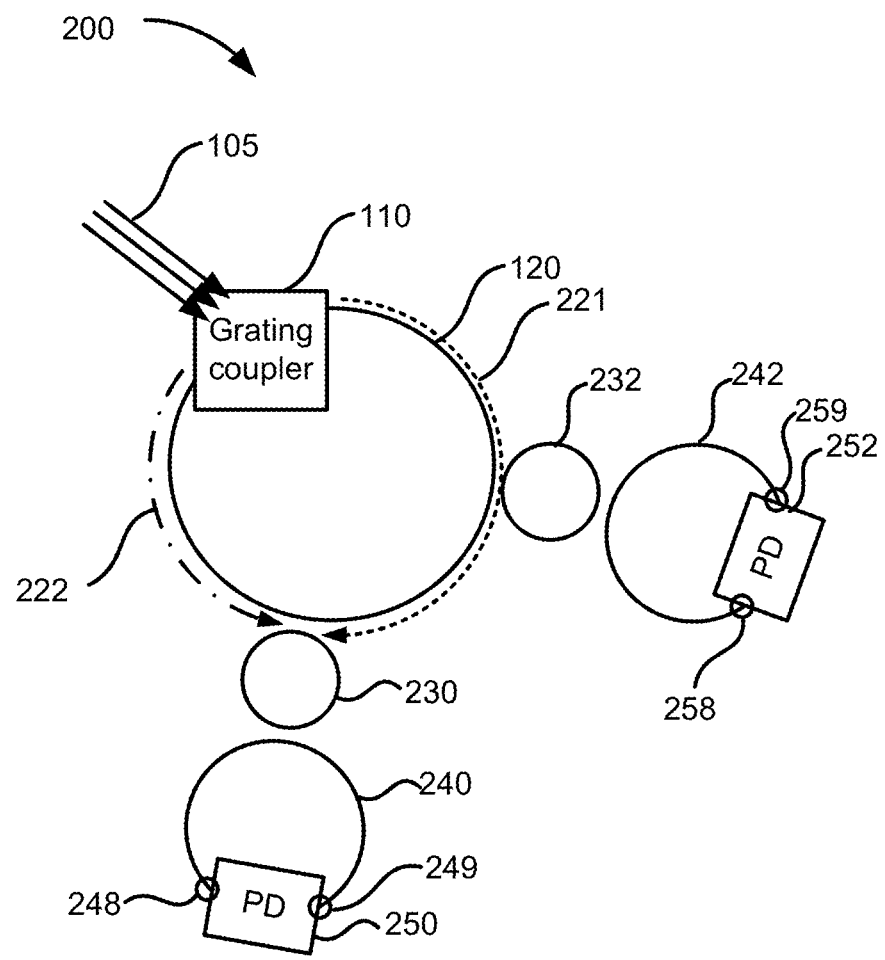
FIG. 2 depicts a diagram of an example receiver system that includes a grating coupler and a loop waveguide, with two asymmetrically positioned ring resonators.

FIG. 2 depicts a diagram of an example receiver system 200 that includes a grating coupler 110, a loop waveguide 120, and two asymmetrically positioned ring resonators, each with a corresponding output waveguide and photodetector. Two ring resonators 230, 232; two output waveguides 240, 242, and two photodetectors 250, 252 are used in this configuration.

A first ring resonator 230 is positioned near the loop waveguide 120 and is tuned to have a resonant wavelength at a first wavelength to couple light at the first wavelength out of the loop waveguide 120 into the first ring resonator 230. A first output waveguide 240 is positioned near the first ring resonator 230 to couple light out of the first ring resonator 230 into the first output waveguide 240. Additionally, a first photodetector 250 detects light propagating out of a first end 249 and a second end 248 of the first output waveguide 240.

Similarly, a second ring resonator 232 is positioned near the loop waveguide 120 and is tuned to have a resonant wavelength at a second wavelength to couple light at the second wavelength out of the loop waveguide 120 into the second ring resonator 232. A second output waveguide 242 is positioned near the second ring resonator 232 to couple light out of the second ring resonator 232 into the second output waveguide 242. Additionally, a second photodetector 252 detects light propagating out of a first end 259 and a second end 258 of the second output waveguide 242. In this manner, light impinging on the grating coupler 110 at two wavelengths may be independently detected. In a similar manner, additional wavelengths may be detected using additional appropriately tuned ring resonators with corresponding output waveguides and photodetectors. Each ring resonator may be tuned with a corresponding wavelength tuning mechanism. In some implementations, the wavelength tuning mechanism may be a temperature adjusting device, such as a heater, individual to each ring resonator, or shared between multiple ring resonators Depending on the position of the first ring resonator 230 relative to the grating coupler 110 and the position and length of the first output waveguide 240, there may be a difference in optical delay between the path traveled by light 221 coupled clockwise and light 222 coupled counter-clockwise into the loop waveguide 120 and is subsequently coupled into the first ring resonator 230 and the first output waveguide 240 before reaching the first photodetector 250.

Figure 3:
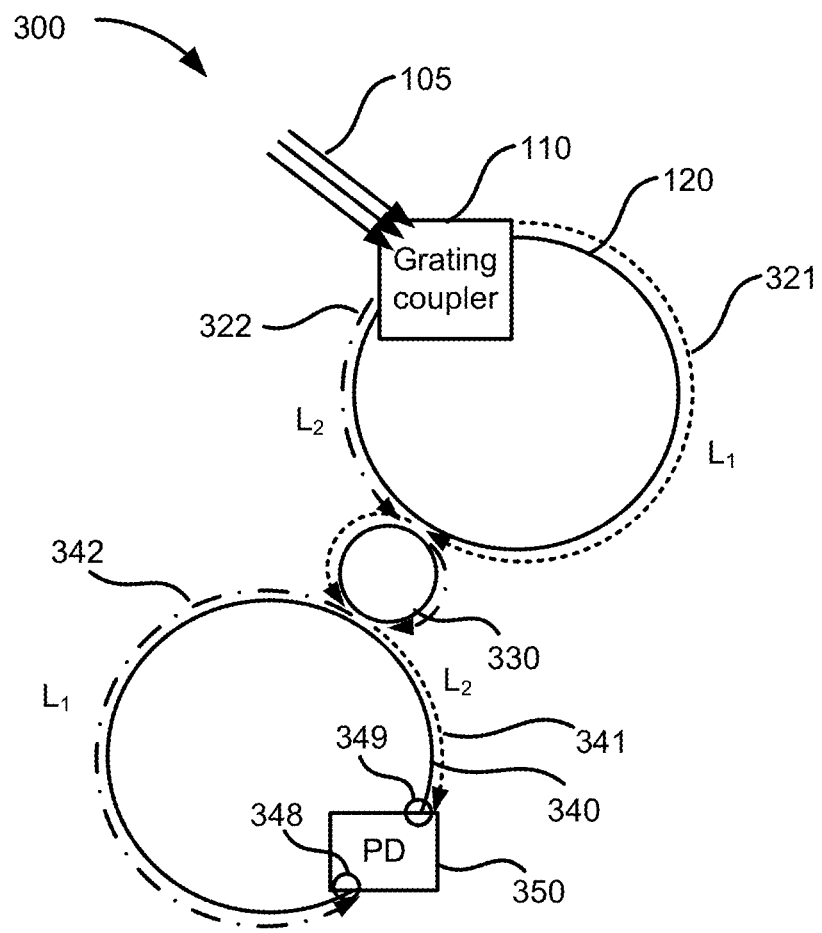
FIG. 3 depicts a diagram of an example receiver system that includes a grating coupler, a loop waveguide, an asymmetrically positioned ring resonator, an output waveguide, and a single photodetector.

FIG. 3 depicts a diagram of an example receiver system 300 that includes a grating coupler 110, a loop waveguide 120, an asymmetrically positioned ring resonator 330, an output waveguide 340, and a single photodetector 350. The first ring resonator 330 couples light out of the loop waveguide 120 at a first position along the loop waveguide 120, where the first position is a first optical delay $L_1$ 321 from the grating coupler in a first direction along the loop waveguide 120 and a second optical delay $L_2$ 322 from the grating coupler 110 in an opposite direction from the first direction along the loop waveguide 120.

Light propagating out of the first end 349 of the first output waveguide 340 to the first photodetector 350 experiences the second optical delay $L_2$ 341 in the first output waveguide 340 and experiences the first optical delay $L_1$ 321 in the loop waveguide 120, and light propagating out of the second end 348 of the first output waveguide 340 to the first photodetector 350 experiences the first optical delay $L_1$ 342 in the first output waveguide 340 and experiences the second optical delay $L_2$ 322 in the loop waveguide 340. Thus, light detected by the first photodetector 350 arrives after experiencing the same total optical delay independent of the path taken by the light to reach the first photodetector 350.

Figure 4:
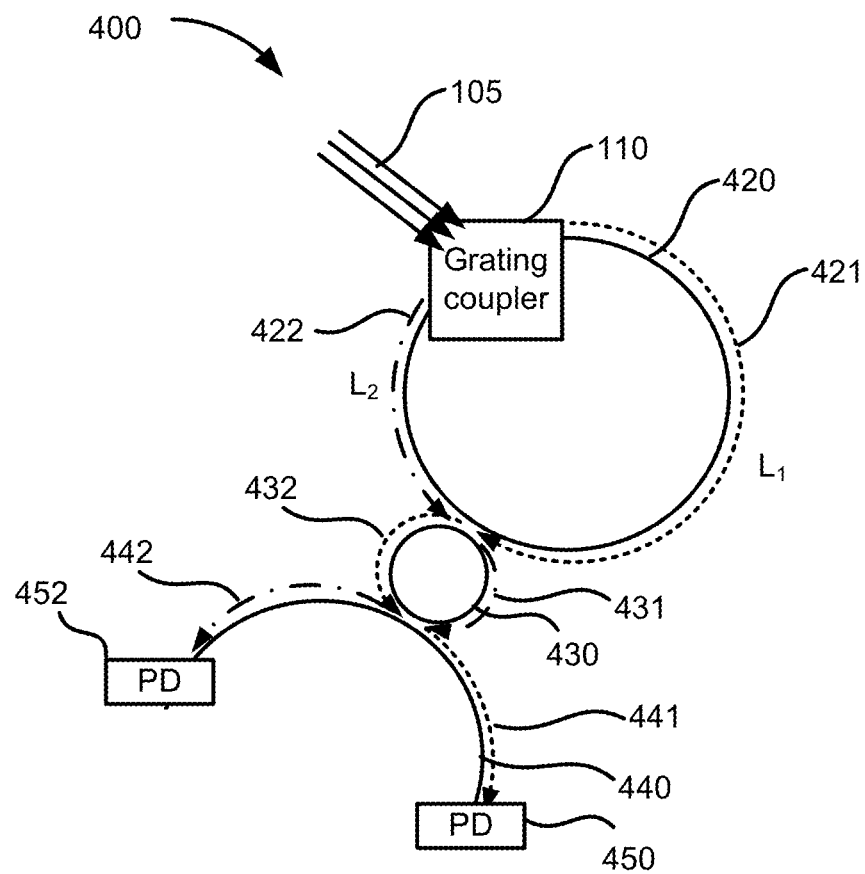
FIG. 4 depicts a diagram of an example receiver system that includes a grating coupler, a loop waveguide, an asymmetrically positioned ring resonator, an output waveguide, and two photodetectors.

FIG. 4 depicts a diagram of an example receiver system 400 that includes a grating coupler 110, a loop waveguide 120, an asymmetrically positioned ring resonator 430, an output waveguide 440, and two photodetectors 450, 452. The ring resonator 430 is asymmetrically positioned with respect to the grating coupler 110 such that light impinging on the grating coupler 110 experiences a first optical delay $L_1$ 421 when propagating clockwise around the loop waveguide 420 and a second optical delay $L_2$ 422 when propagating counter-clockwise around the loop waveguide 420, where the first optical delay $L_1$ 421 is different from the second optical delay $L_2$ 422. Rather than compensating for the difference in optical delay by adjusting the optical delay that the light experiences in the output waveguide 440, as with the example of FIG. 3 described above, two photodetectors 450, 452 may be used. Then the difference in arrival times of the light detected by the first photodetector 450 and the light detected by the second photodetector 452 may be compensated for electronically. For example, the difference in arrival times may be compensated using electrical delay lines or digital signal processing.

FIG. 5A1 depicts a diagram of an example polarization diverse receiver system 500A that includes cascaded ring resonators 530, 532. When light 105 impinges upon the grating coupler 110, light having a first polarization may couple into the loop waveguide 120 in a first direction, for example, in a clockwise direction, and light having a second polarization orthogonal to the first polarization may couple into the loop waveguide 120 in a second direction, for example, in a counter-clockwise direction.

The system 500A includes a first plurality of ring resonators 530, 532 having a same first resonant wavelength, where a first ring resonator 530 of the first plurality of ring resonators is positioned near the loop waveguide 120 to couple light at the first resonant wavelength in the loop waveguide 120 to the first ring resonator 530. Light at the first resonant wavelength in the first ring resonator 530 couples sequentially via each of the other first plurality of ring resonators to a last ring resonator 532 of the first plurality of ring resonators. In the example shown in FIG. 5A, the first plurality of ring resonators includes two ring resonators 530, 532, however, the first plurality of ring resonators may include more than two ring resonators.

The system 500A also includes a first output waveguide 540 positioned near the last ring resonator 532 to couple light out of the last ring resonator 532. Further, the system 500A includes a first photodetector 550 to detect light propagating out of a first end 549 of the first output waveguide 540, and a second photodetector 552 to detect light propagating out of a second end 548 of the first output waveguide 540.

The ring resonators in the first plurality of ring resonators each has a cavity size that corresponds to an optical period or free spectral range. A longer ring resonator corresponds to a shorter period. For the case where there are two cascaded ring resonators 530, 532, and the ring resonators 530, 532 have the same cavity size, a plot 501 of transmission as a function of frequency/free spectral range (FSR) is shown on the left side of FIG. 5A1. Note that for two cascaded ring resonators (graphed line with solid circles), the bandpass is broadened and has a steeper slope in the filter response, as compared to a single ring resonator (graphed line with open circles). If three or more ring resonators are cascaded, the bandpass would be correspondingly broader with yet steeper slopes.

As discussed above, longer ring resonators have shorter periods. For optical communication systems where it is desirable to include more channels, the system should have larger periods, which means that the cavity of the ring resonators should be smaller. However, beyond a minimum bend radius, the loss in the ring resonator increases to an unacceptable level. Another way to obtain a longer period is to cascade two ring resonators having different delays, and the effective period is the least common multiple of the individual periods of the two ring resonators. For the case where there are two cascaded ring resonators 530, 532, and the ring resonators 530, 532 have different delays, an example plot of transmission as a function of frequency/free spectral range (FSR) is shown in FIG. 5A2. The plot compares transmission as a function of the number of channels for a ring resonator with a smaller cavity (graphed line with open circle), a ring resonator with a larger cavity (graphed line with solid circle), and a cascade of the two different sizes of ring resonators (graphed line with x). The expanded plot of the right of FIG. 5A2 shows that the bandpass is wider with steeper slopes for the cascaded ring resonators as compared to the individual ring resonators.

Thus, in some implementations, the first plurality of ring resonators may include any optical delay. The larger the number of ring resonators, the higher the order of the optical filter. Further, some or all of the plurality of ring resonators may have a different delay.

In some implementations, a resonant wavelength-tuning mechanism may be used, for example, a temperature adjusting device, such as a heater, to tune each ring resonator in a cascade of resonators to the same resonant wavelength. Additionally, the ring resonators in the cascade of resonators may also be tuned as a group.

In some implementations, the first photodetector 550 is different from the second photodetector 552, and different arrival times in light detected by the first photodetector 550 and light detected by the second photodetector 552 may be compensated for electronically.

Figure 5B:
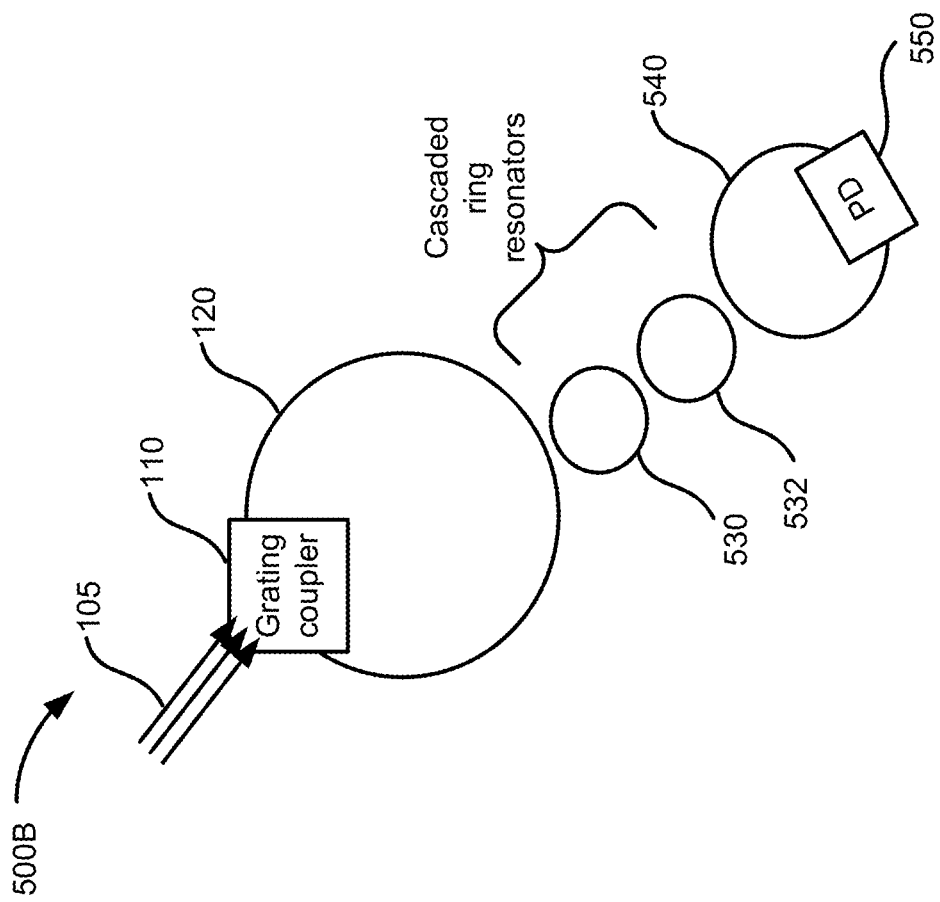
FIG. 5B depicts a diagram of another example receiver system that includes cascaded ring resonators and a single photodetector.

FIG. 5B depicts a diagram of another example polarization diversity receiver system 500B that includes cascaded ring resonators. The system 500B is similar to system 500A described above in FIG. 5A1, however, the first photodetector 550 is the same as the second photodetector 552 so that the first photodetector 550 receives light exiting the first and second ends of the first output waveguide 540. Also, the first ring resonator 530 couples light out of the loop waveguide 120 at a first position along the loop waveguide 120 having equal optical delays to the grating coupler 110 along both directions (clockwise and counter-clockwise) of the loop waveguide 120.

Figure 5C:
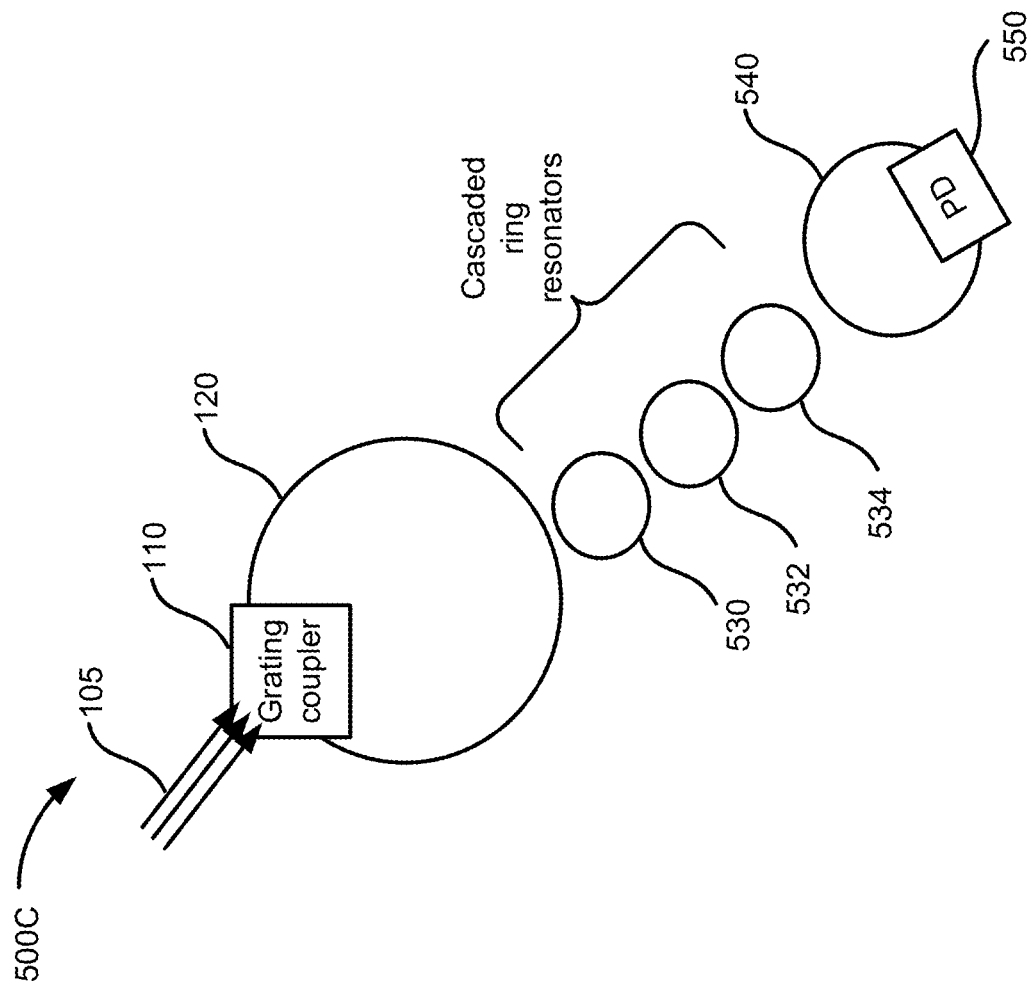
FIG. 5C depicts a diagram of an example receiver system that includes cascaded ring resonators with two photodetectors, and includes an example plot of transmission as a function of frequency/free spectral range (FSR) for two cascaded ring resonators.

FIG. 5C depicts a diagram of another example polarization diversity receiver system 500C that includes cascaded ring resonators. The system 500C is similar to system 500B described above in FIG. 5B, however, there are three cascaded ring resonators 530, 532, 534. The third ring resonator of the first plurality of ring resonators has a third cavity size corresponding to a third optical period and the light at the first resonant wavelength in the first ring resonator couples sequentially via the cascaded ring resonators from first ring resonator 530 to second ring resonator 532 of the first plurality of ring resonators, and then to third ring resonator 534 to form the cascaded resonator with first ring resonator 530 and second ring resonator 532.

Figure 6A:
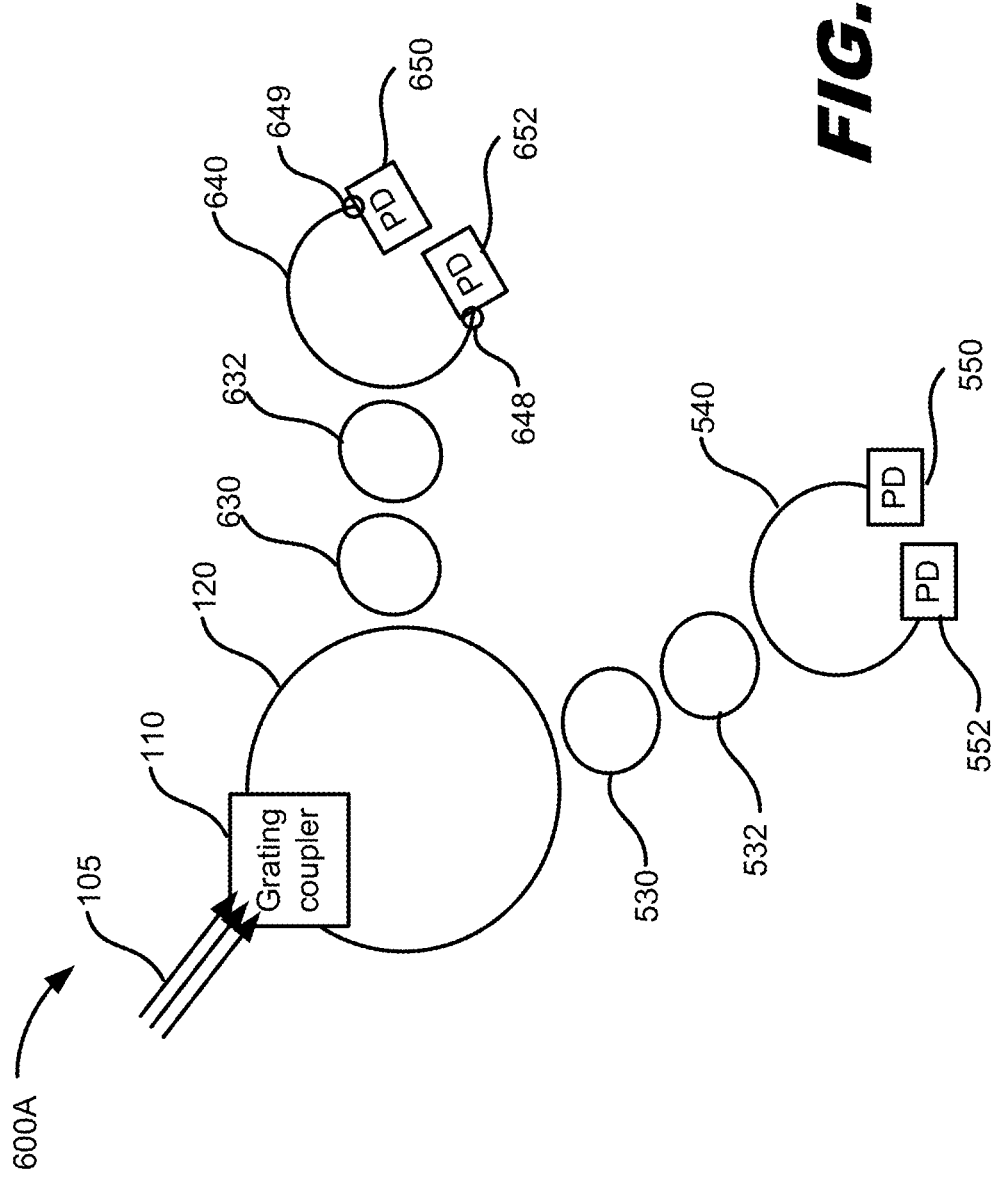
FIG. 6A depicts a diagram of another example receiver system that includes two sets of cascaded ring resonators, each set having two photodetectors.

FIG. 6A depicts a diagram of another example polarization diverse receiver system 600A that includes cascaded ring resonators. The system 600A is similar to system 500A described above in FIG. 5A1, however, it includes a second plurality of ring resonators 630, 632 having a same second resonant wavelength, different from the first resonant wavelength, where a first ring resonator 630 of the second plurality of ring resonators is positioned near the loop waveguide 120 to couple light at the second resonant wavelength in the loop waveguide 120 to the first ring resonator 630, wherein light at the second resonant wavelength in the first ring resonator 630 couples sequentially via each of the other second plurality of ring resonators to a last ring resonator 632 of the second plurality of ring resonators.

The system 600A also includes a second output waveguide 640 positioned near the last ring resonator 632 of the second plurality of ring resonators to couple light out of the last ring resonator 632 of the second plurality of ring resonators. Additionally, the system includes a third photodetector 650 to detect light propagating out of a first end 649 of the second output waveguide 640, and a fourth photodetector 652 to detect light propagating out of a second end 648 of the second output waveguide 640. Thus, the system 500B shown in the example of FIG. 5B can detect two orthogonal polarizations of light at two different wavelengths. Additional wavelengths of light may also be detected with further sets of ring resonators, output waveguide, and photodetectors.

Figure 6B:
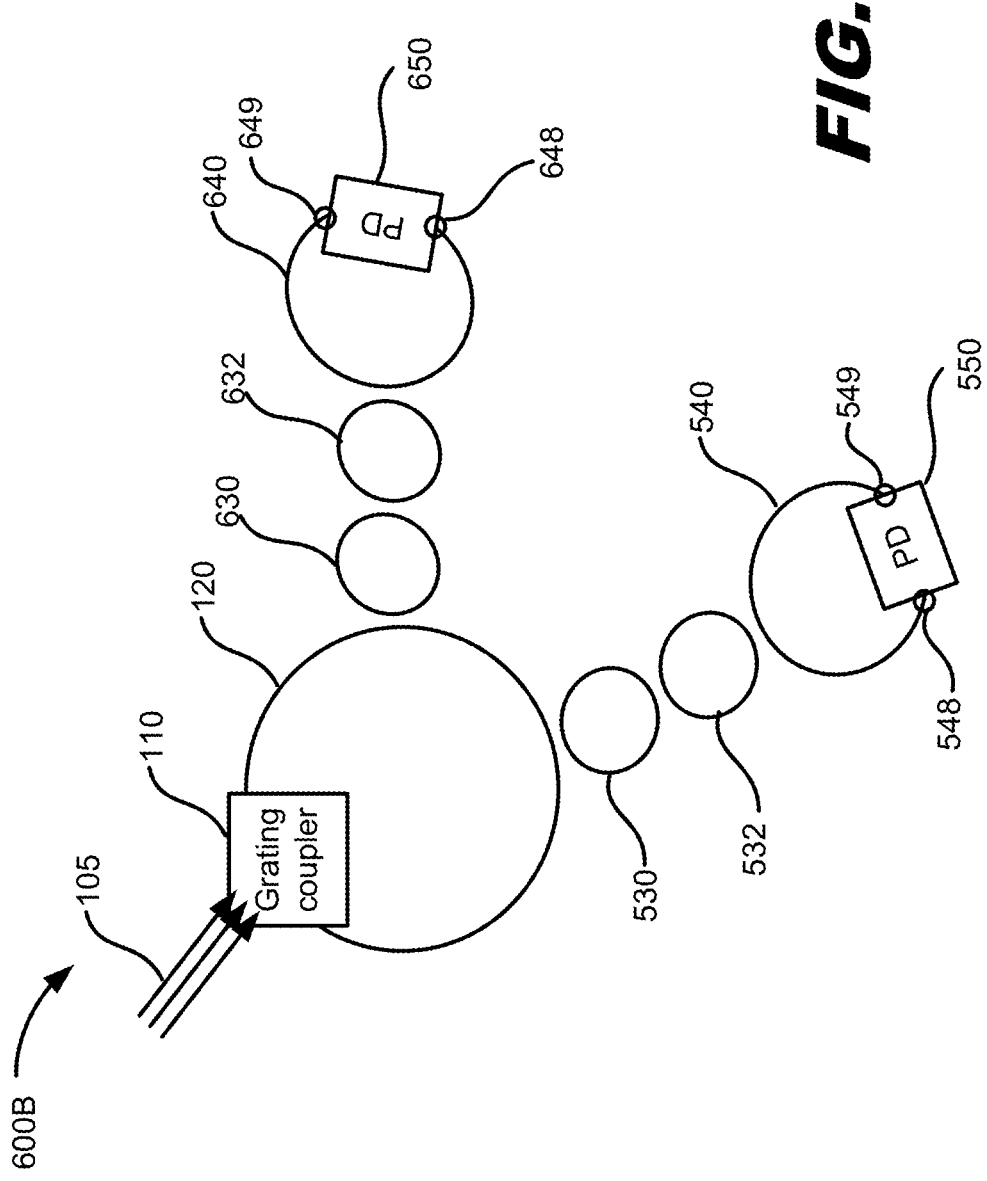
FIG. 6B depicts a diagram of another example receiver system that includes two sets of cascaded ring resonators, each set having a single photodetector.

FIG. 6B depicts a diagram of another example polarization diverse receiver system 600B that includes cascaded ring resonators. The system 600B is similar to system 600A described above in FIG. 6A, however, the first photodetector 550 is the same as the second photodetector 552, and the third photodetector 650 is the same as the fourth photodetector 652. Further, the first plurality of ring resonators 530, 532 and the first photodetector 550 are positioned such that light entering the first photodetector 550 from the first end 549 of the first output waveguide 540 experiences a same optical delay as light entering the first photodetector 550 from the second end 548 of the first output waveguide 540. Also, the second plurality of ring resonators 630, 632 and the third photodetector 650 are positioned such that light entering the third photodetector 650 from the first end 649 of the second output waveguide 640 experiences a same optical delay as light entering the third photodetector 650 from the second end 648 of the second output waveguide 640.

Figure 6C:
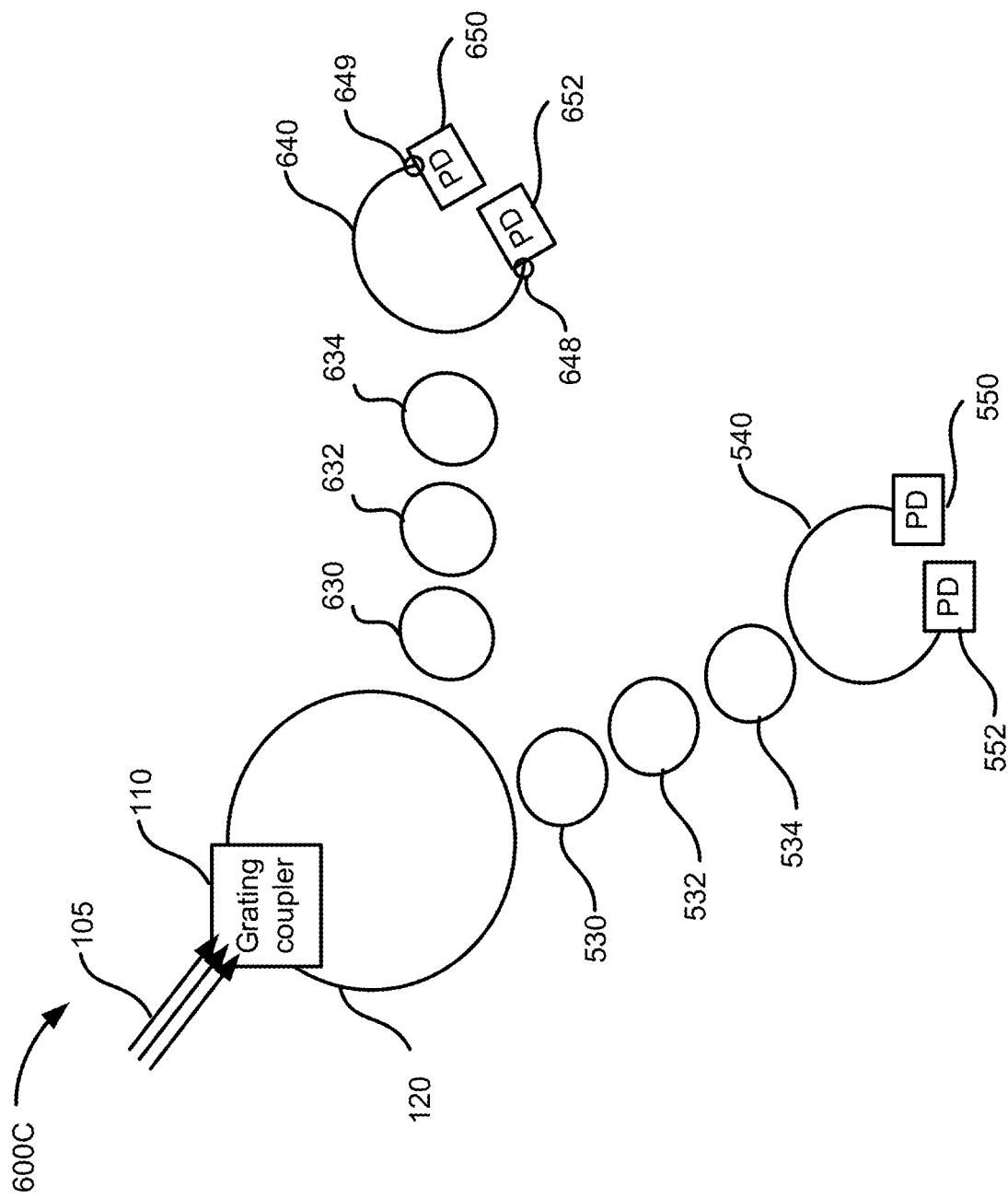
FIG. 6C depicts a diagram of another example receiver system that includes two sets of cascaded ring resonators, each set having two photodetectors.

FIG. 6C depicts a diagram of another example polarization diverse receiver system 600C that includes three cascaded ring resonators. The system 600C is similar to system 500A described above in FIG. 5A1, however, it includes at least three cascaded of ring resonators instead of two cascaded ring resonators. As described with FIG. 5A1, if three or more ring resonators are cascaded, the bandpass is correspondingly broader with yet steeper slopes in the filter response.

As illustrated, system 600C includes a second plurality of ring resonators, including fourth ring resonator 630, fifth ring resonator 632, and sixth ring resonator 634, having a same second resonant wavelength, different from the first resonant wavelength, where fourth ring resonator 630 of the second plurality of ring resonators is positioned near the loop waveguide 120 to couple light at the second resonant wavelength in the loop waveguide 120 to fourth ring resonator 630. Light at the second resonant wavelength in fourth ring resonator 630 couples sequentially via the second plurality of ring resonators from fourth ring resonator 630 to fifth ring resonator 632 of the second plurality of ring resonators, and then to sixth ring resonator 634 of the second plurality of ring resonators.

FIG. 6D depicts a diagram of another example polarization diverse receiver system 600D that includes cascaded ring resonators. The system 600D is similar to system 600B described above in FIG. 6B, however, the first photodetector 550 is the same as the second photodetector 552, the third photodetector 650 is the same as the fourth photodetector 652. Further, the first plurality of ring resonators 530, 532, 534 and the first photodetector 550 are positioned such that light entering the first photodetector 550 from the first end 549 of the first output waveguide 540 experiences a same optical delay as light entering the first photodetector 550 from the second end 548 of the first output waveguide 540. Also, the second plurality of ring resonators, including fourth ring resonator 630, fifth ring resonator 632, and sixth ring resonator 634, and the third photodetector 650 are positioned such that light entering the third photodetector 650 from the first end 649 of the second output waveguide 640 experiences a same optical delay as light entering the third photodetector 650 from the second end 648 of the second output waveguide 640.

Each set of plurality of ring resonators may include any combination of optical delays in the example system configurations shown in FIGS. 5B, 5C, 6A, and 6B.

Figure 7:
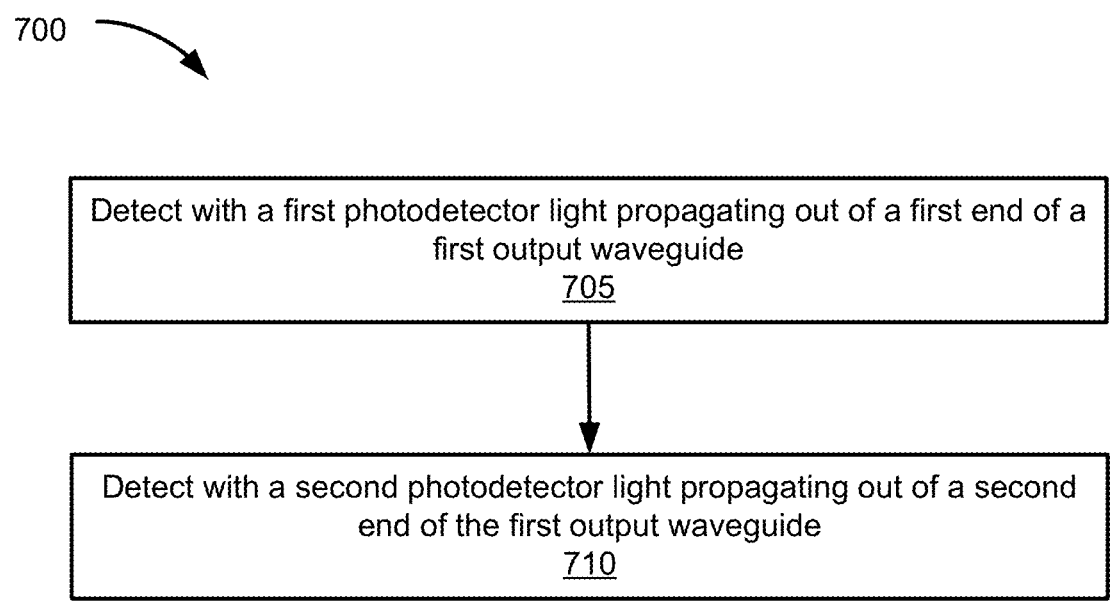
FIG. 7 depicts a flow diagram illustrating an example process of detecting light having orthogonal polarization components.

FIG. 7 depicts a flow diagram illustrating an example process 700 of detecting light having orthogonal polarization components.

The process begins at block 705, where light propagating out of a first end of a first output waveguide may be detected with a first photodetector.

At block 710, light propagating out of a second end of the first output waveguide may be detected with a second photodetector. The first output waveguide is positioned near a first ring resonator to couple light out of the first ring resonator into the first output waveguide. Further, the first ring resonator is positioned near a loop waveguide and tuned to have a resonant wavelength at a first wavelength to couple light at the first wavelength out of the loop waveguide into the first ring resonator. Additionally, a grating coupler is formed on the loop waveguide to couple light impinging on the grating coupler having a first polarization into the loop waveguide in a first direction and to couple light having a second polarization orthogonal to the first polarization into the loop waveguide in a second direction.

In some implementations, the first photodetector is the same as the second photodetector, and the first ring resonator couples light out of the loop waveguide at a first position along the loop waveguide with equal optical delays to the grating coupler along both directions of the loop waveguide.

In some implementations, the first photodetector is the same as the second photodetector. Further, the first ring resonator couples light out of the loop waveguide at a first position along the loop waveguide, where the first position is a first optical delay from the grating coupler in a first direction along the loop waveguide and a second optical delay from the grating coupler in an opposite direction from the first direction along the loop waveguide. Also, light propagating out of the first end of the first output waveguide to the first photodetector experiences the second optical delay in the first output waveguide and experiences the first optical delay in the loop waveguide, and light propagating out of the second end of the first output waveguide to the first photodetector experiences the first optical delay in the first output waveguide and experiences the second optical delay in the loop waveguide.

In some implementations, the first photodetector is different from the second photodetector. Also, a second ring resonator is positioned near the loop waveguide tuned to have a resonant wavelength at a second wavelength, different from the first wavelength, to couple light at the second wavelength out of the loop waveguide into the second ring resonator Additionally, example process 700 for detecting light having orthogonal polarization components may also include electronically compensating for different arrival times in light detected by the first photodetector and light detected by the second photodetector.

FIG. 8 depicts a flow diagram illustrating another example process 800 of detecting light having orthogonal polarization components.

The process begins at block 805 which may be similar to block 705 described with respect to process 700 of FIG. 7. Block 810 may also be similar to block 710 of FIG. 7.

At block 815, light propagating out of a first end of a second output waveguide may be detected with a third photodetector.

At block 820, light propagating out of a second end of a second output waveguide may be detected with a fourth photodetector. The second output waveguide is positioned near a second ring resonator to couple light out of the second ring resonator into the second waveguide. And the second ring resonator is positioned near the loop waveguide and tuned to have a resonant wavelength at a second wavelength to couple light at the second wavelength out of the loop waveguide into the second ring resonator.

At block 825, the resonant wavelength of the first ring resonator may be tuned, for example, by injecting carriers or changing the temperature of a portion or all of the ring resonator.

Not all of the steps or features presented above are used in each implementation of the presented techniques. Steps may be performed in a different order than presented.

As used in the specification and claims herein, the singular forms "a," "an," and "the" include plural referents unless the context clearly dictates otherwise.

What is claimed is:

1. A system, comprising:
a loop waveguide;
a grating coupler formed on the loop waveguide to couple light impinging on the grating coupler having a first polarization into the loop waveguide in a first direction, and to couple light having a second polarization orthogonal to the first polarization into the loop waveguide in a second direction;
a first plurality of ring resonators tuned to a first resonant wavelength, wherein a first ring resonator of the first plurality of ring resonators having a first cavity size corresponding to a first optical period and positioned near the loop waveguide to couple light at the first resonant wavelength out of the loop waveguide into the first ring resonator, wherein the light at the first resonant wavelength in the first ring resonator couples sequentially via the first plurality of ring resonators from the first ring resonator to a second ring resonator of the first plurality of ring resonators, wherein the second ring resonator of the first plurality of ring resonators having a second cavity size corresponding to a second optical period that is different from the first optical period and positioned to receive light coupled out from the first ring resonator and form a cascaded resonator with the first ring resonator, wherein an optical period of the cascaded resonator corresponds to a least common multiple of at least the first optical period and the second optical period, and
wherein the first plurality of ring resonators further comprises a third ring resonator of the first plurality of ring resonators having a third cavity size corresponding to a third optical period and wherein the light at the first resonant wavelength in the first ring resonator couples sequentially via the first plurality of ring resonators from the first ring resonator to the second ring resonator of the first plurality of ring resonators, and then to the third ring resonator of the first plurality of ring resonators to form the cascaded resonator with the first ring resonator and the second ring resonator;
a first output waveguide positioned near the third ring resonator to couple light out of the third ring resonator into the first output waveguide;
a first photodetector to detect light propagating out of a first end and a second end of the first output waveguide;
a second plurality of ring resonators tuned to a second resonant wavelength, wherein a forth ring resonator of the second plurality of ring resonators is positioned near the loop waveguide to couple light at the second resonant wavelength in the loop waveguide to the forth ring resonator, wherein light at the second resonant wavelength in the second ring resonator couples sequentially via the second plurality of ring resonators from the forth ring resonator to a fifth ring resonator of the second plurality of ring resonators, and then to a sixth ring resonator of the second plurality of ring resonators;
a second output waveguide positioned near the sixth ring resonator to couple light out of the sixth ring resonator; and
a second photodetector to detect light propagating out of a first end and a second end of the second output waveguide.

2. The system of claim 1, further comprising a mechanism to tune the first resonant wavelength of the first ring resonator.

3. The system of claim 1,
wherein the first ring resonator couples light out of the loop waveguide at a first position along the loop waveguide, wherein the first position is a first optical delay from the grating coupler in a first direction along the loop waveguide and a second optical delay from the grating coupler in an opposite direction from the first direction along the loop waveguide,
wherein light propagating out of the first end of the first output waveguide to the first photodetector experiences the second optical delay in the first output waveguide and experiences the first optical delay in the loop waveguide, and light propagating out of the second end of the first output waveguide to the first photodetector experiences the first optical delay in the first output waveguide and experiences the second optical delay in the loop waveguide.

4. The system of claim 1, wherein the first polarization into the loop waveguide in the first direction is a clockwise direction and the second polarization orthogonal to the first polarization into the loop waveguide in the second direction is a counter-clockwise direction.

5. The system of claim 4, wherein the clockwise direction and the counter-clockwise direction have transverse electric (TE) polarization.

6. The system of claim 1, wherein the loop waveguide is an elliptical shape.

7. The system of claim 1, wherein the loop waveguide is a racetrack shape.

8. The system of claim 1, wherein the first photodetector is a broadband detector and the first ring resonator operates a bandpass filter.

9. A system, comprising:
a loop waveguide;
a grating coupler formed on the loop waveguide to couple light of a first polarization into the loop waveguide in a first direction and to couple light of a second polarization orthogonal to the first polarization into the loop waveguide in a second direction;

a first plurality of ring resonators tuned to a first resonant wavelength, wherein a first ring resonator of the first plurality of ring resonators is positioned near the loop waveguide to couple light at the first resonant wavelength in the loop waveguide to the first ring resonator, wherein light at the first resonant wavelength in the first ring resonator couples sequentially via each of the first plurality of ring resonators from the first ring resonator to a second ring resonator of the first plurality of ring resonators, wherein a cavity size of the second ring resonator is different from a cavity size of at least one ring resonator of the first plurality of ring resonators, wherein an optical period of the first plurality of ring resonators corresponds to a least common multiple of at least two different optical periods of two ring resonators of the first plurality of ring resonators, and wherein the first plurality of ring resonators further comprises a third ring resonator of the first plurality of ring resonators having a third cavity size corresponding to a third optical period and wherein the light at the first resonant wavelength in the first ring resonator couples sequentially via the first plurality of ring resonators from the first ring resonator to the second ring resonator of the first plurality of ring resonators, and then to the third ring resonator of the first plurality of ring resonators to form the cascaded resonator with the first ring resonator and the second ring resonator;

a first output waveguide positioned near the third ring resonator to couple light out of the third ring resonator;

a first photodetector to detect light propagating out of a first end of the first output waveguide;

a second photodetector to detect light propagating out of a second end of the first output waveguide;

a second plurality of ring resonators tuned to a second resonant wavelength, wherein a fourth ring resonator of the second plurality of ring resonators is positioned near the loop waveguide to couple light at the second resonant wavelength in the loop waveguide to the forth ring resonator, wherein light at the second resonant wavelength in the fourth ring resonator couples sequentially via the second plurality of ring resonators from the fourth ring resonator to a fifth ring resonator of the second plurality of ring resonators, and then to a sixth ring resonator of the second plurality of ring resonators;

a second output waveguide positioned near the sixth ring resonator to couple light out of the sixth ring resonator;

a third photodetector to detect light propagating out of a first end of the second output waveguide; and a fourth photodetector to detect light propagating out of a second end of the second output waveguide.

10. The system of claim 9, wherein the second plurality of ring resonators having a second resonant wavelength is different from the first resonant wavelength.

11. The system of claim 10,
wherein the first plurality of ring resonators and the first photodetector are positioned such that light entering the first photodetector from the first end of the first output waveguide experiences a same optical delay as light entering the second photodetector from the second end of the first output waveguide, and
wherein the second plurality of ring resonators and the third photodetector are positioned such that light entering the third photodetector from the first end of the second output waveguide experiences a same optical delay as light entering the fourth photodetector from the second end of the second output waveguide.

12. The system of claim 9, wherein the first ring resonator couples light out of the loop waveguide at a first position along the loop waveguide with equal optical delays to the grating coupler along both directions of the loop waveguide.

13. The system of claim 9,
wherein the first photodetector is different from the second photodetector,
wherein different arrival times in light detected by the first photodetector and light detected by the second photodetector is compensated for electronically.

14. A method comprising:
detecting, with a first photodetector, a light propagating out of a first end and a second end of a first output waveguide; and
detecting, with a second photodetector, a light propagating out of a third end and a fourth end of a second output waveguide;
wherein:
the first output waveguide is positioned near a cascaded resonator including a first plurality of ring resonators comprising a first ring resonator, a second ring resonator, and a third ring resonator, the cascaded resonator configured to couple light into the first output waveguide, and wherein the second ring resonator has a second cavity with a cavity size different from a first cavity with a cavity size of the first ring resonator, the second cavity of the second ring resonator corresponding to a second optical period and the first cavity of the first ring resonator corresponding to a first optical period different from the second optical period, the cascaded resonator having an optical period corresponding to a least common multiple of the first and second optical periods wherein the first plurality of ring resonators is positioned near a loop waveguide and tuned to have a first resonant wavelength to couple light at the first resonant wavelength out of the loop waveguide into the first plurality of ring resonators,
the second output waveguide is positioned near a second plurality of ring resonators comprising a fourth ring resonator, a fifth ring resonator, and a sixth ring resonator, the second plurality of ring resonators configured to couple light at a second resonant wavelength out of the loop waveguide into the second plurality of ring resonators,
a grating coupler is formed on the loop waveguide to couple light impinging on the grating coupler having a first polarization into the loop waveguide in a first direction from the first plurality of ring resonators and to couple light having a second polarization orthogonal to the first polarization into the loop waveguide in a second direction from the first plurality of ring resonators.

15. The method of claim 14, wherein the first ring resonator couples light out of the loop waveguide at a first position along an optical delay to the grating coupler along both directions of the loop waveguide.

16. The method of claim 14,
wherein the first ring resonator couples light out of the loop waveguide at a first position along the loop waveguide, wherein the first position is a first optical delay from the grating coupler in a first direction along the loop waveguide and a second optical delay from the grating coupler in an opposite direction from the first direction along the loop waveguide, wherein light propagating out of the first end of the first output waveguide to the first photodetector experiences the second optical delay in the first output waveguide and experiences the first optical delay in the loop waveguide, and light propagating out of the second end of the first output waveguide to the first photodetector experiences the first optical delay in the first output waveguide and experiences the second optical delay in the loop waveguide.

17. The method of claim 14, further comprising:
electronically compensating for different arrival times in light detected by the first photodetector and light detected by the second photodetector.

18. The method of claim 14, further comprising:
tuning the resonant wavelength of the first ring resonator such that the first and second ring resonators have a same resonant wavelength.

* * * * *